(12) United States Patent
Becker (10) Patent No.: US 6,700,435 B2
(45) Date of Patent: Mar. 2, 2004

(54) LOCAL SUPPLY GENERATOR FOR A DIGITAL CMOS INTEGRATED CIRCUIT HAVING AN ANALOG SIGNAL PROCESSING CIRCUITRY

(75) Inventor: Rolf Friedrich Philipp Becker, Adliswil (CH)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/204,745
(22) PCT Filed: Jan. 9, 2002
(86) PCT No.: PCT/IB02/00053
§ 371 (c)(1), (2), (4) Date: Aug. 23, 2002
(87) PCT Pub. No.: WO02/056449
PCT Pub. Date: Jul. 18, 2002

(65) Prior Publication Data
US 2003/0034822 A1 Feb. 20, 2003

(30) Foreign Application Priority Data
Jan. 10, 2001 (EP) .............................. 01100534

(51) Int. Cl.[7] ................................................ G05F 1/10
(52) U.S. Cl. ........................................................ 327/536
(58) Field of Search ................................ 327/530, 534, 327/535, 536, 537

(56) References Cited

U.S. PATENT DOCUMENTS

| 4,079,336 A | 12/1976 | Gross | 330/296 |
|---|---|---|---|
| 5,694,308 A | 7/1995 | Cave | 363/59 |
| 2001/0011919 A1 * | 8/2001 | Tanimoto | 327/536 |

* cited by examiner

Primary Examiner—Jeffrey Zweizig
(74) Attorney, Agent, or Firm—Steven R. Biren (57) ABSTRACT

Digital CMOS integrated circuit (120) comprising an analog signal processing circuitry with a series of two or more field-effect transistors (FETs). The FETs have a maximum allowed supply voltage value (Vmax). The digital CMOS integrated circuit (120) further comprises a local charge pump (135) for generating an elevated supply voltage (Vsupplydiff) larger than the maximum allowed supply voltage value (Vmax). The local charge pump (135) is arranged such that this elevated supply voltage (Vsupplydiff) is applied to the series of two or more of the field-effect transistors (FETs).

21 Claims, 10 Drawing Sheets

$Vref = Vt1 + Vs1$

FIG. 9A

$Vref2 = Vt1 + Vt2 + Vs1 + vs2$

LOCAL SUPPLY GENERATOR FOR A DIGITAL CMOS INTEGRATED CIRCUIT HAVING AN ANALOG SIGNAL PROCESSING CIRCUITRY

FIELD OF THE INVENTION

The present invention relates to electronic circuits. More particularly, the present invention relates to novel and improved integrated circuits and devices that process digital and analog signals.

BACKGROUND OF THE INVENTION

In many applications, analog circuitry and digital circuitry are required. Examples are digital radios, optical communications chips, and digital signal processors (DSPs).

In these applications, integrated circuits (ICs) such as very large scale integrated (VLSI) circuits containing digital and analog signal processing circuitry are employed. These ICs are sometimes referred to as mixed signal ICs. The digital signal processing circuitry may include both low-voltage circuitry where the digital supply voltage typically is 1.0–2.0 Volts and high-voltage circuitry where, as with the analog signal processing circuitry, the supply voltage is larger than 2 V.

Field-effect transistors (FETs), specifically those of the Metal-Oxide Semiconductor (MOS) type, constitute the main active circuit elements currently used in ICs. This is also the case for CMOS (Complementary Metal-Oxide Semiconductor) circuit implementations.

The operational characteristics of FETs in the analog and high-voltage digital portions typically differ from the characteristics of FETs in the low-voltage digital portions.

FETs used in the low-voltage digital circuitry of an IC are typically manufactured at the minimum gate length that can be reliably formed and still yield acceptable electrical performance characteristics. Device miniaturization has brought the minimum gate length down to 0.1–0.2 μm. As the minimum gate length is reduced, physical parameters such as gate dielectric thickness, source/drain junction depth, net channel doping, threshold voltage, and supply voltage are adjusted together according to appropriate scaling rules. This enables the transistors to be fabricated at small dimensions without the deleterious effects, such as non-saturating output characteristics, threshold-voltage dependence on channel length, and drain-induced current leakage, that are associated with short-channel FETs.

Up to now, a manufacturing process used to fabricate low-voltage FETs for an IC must also provide differently designed FETs that can perform analog functions at higher voltages. The IC designs where the FETs of the digital signal processing circuitry and the FETs of the analog signal processing circuitry are operated at different supply voltages are complicated and expensive.

Quite often one has to employ the same FETs in the analog signal processing circuitry and the digital signal processing circuitry of a digital CMOS integrated circuit. This leads to situations where FETs in the analog signal processing circuitry are operated at a bias voltage significantly below the maximum allowed supply voltage (Vmax). The signal-to-noise (S/N) ratio may thus not be acceptable anymore.

Figure 1:
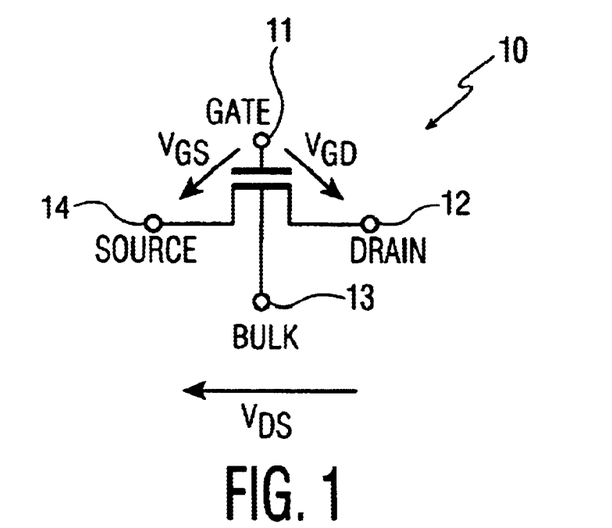
FIG. 1 shows a field-effect transistor (FET) and the voltages across the transistor nodes.

In modern MOS and CMOS processes, the maximum allowed supply voltage (herein called VDDmax) is determined by reliability considerations for the application of transistors (FETs) in standard digital gates. The requirement is that any voltage difference across the nodes of the transistors does not go beyond a certain limit Vmax. The relevant voltages for an n-channel FET 10 are depicted in FIG. 1. The voltage between the gate 11 and the drain 12 is called VGD, the voltage between the drain 12 and the source 14 is called VDS, and the voltage between the gate 11 and the source 14 is called VGS. All the voltages have to be below Vmax for the FET 10 to operate reliably. For digital gates this requires Vmax to be the maximum allowed supply voltage of the whole IC chip. The voltages towards the bulk 13 are not limited to the same extent.

If the same FETs are being used in the analog signal processing circuitry, this requires the signal swing to stay within the limits posed by the maximum allowed supply voltage Vmax. With supply voltages going down further with the advance of smaller geometry this has a severe impact on the achievable dynamic signal range, i.e., the S/N ratio is getting worse.

On the other hand, in analog signal processing circuitry the voltages across transistor nodes are not necessarily equal to the supply voltage of the whole IC chip. An example is given in FIG. 2. This Figure shows a well known differential amplifier 20 being frequently used throughout analog signal processing in operation amplifiers (OpAmps), comparators, etc.

Figure 2:
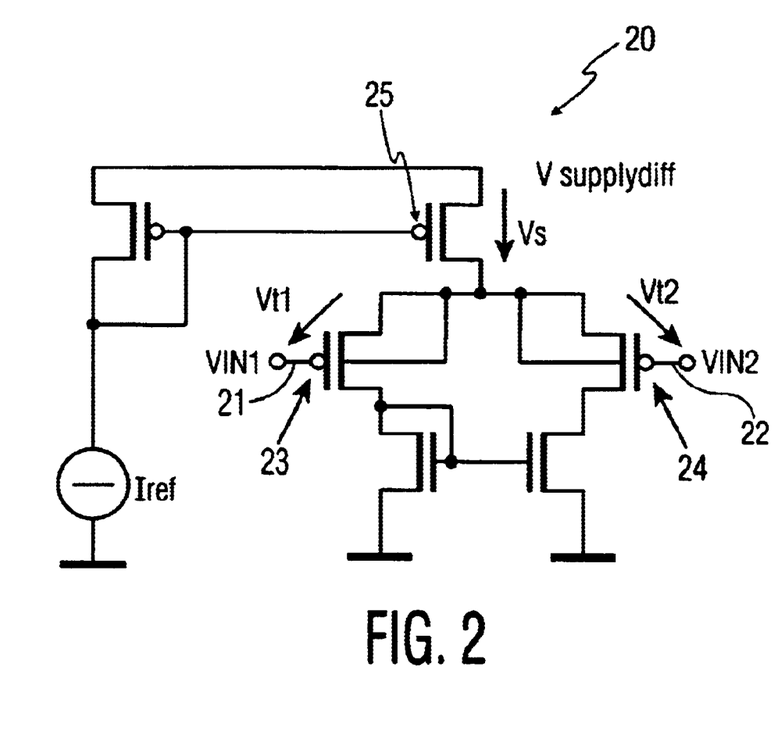
FIG. 2 is a schematic illustration of a known differential amplifier.
Figure 3:
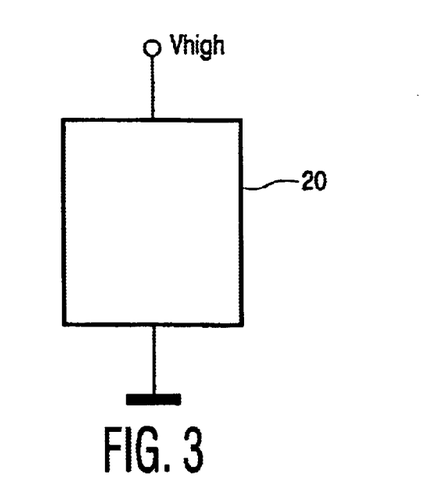
FIG. 3 is a schematic illustration of a local charge pump, in accordance with the present invention.

The signal on nodes VIN1 21 and VIN2 22, respectively, must not exceed a value of Vsupplydiff−Vs−Vt1 for proper operation. Vt1=Vt2 represent the gate to source voltages (VGS) for the input transistors 23 and 24 in saturation (i.e., close to the threshold value). Vs is the source to drain voltage (VSD) across the transistor 25 serving as current mirror. It is a disadvantage of the present circuit 20 that the allowed signal swing of the analog signals on the nodes VIN1 21 and VIN2 22 are many hundred millivolts below the supply voltage Vsupply. On the other hand, all voltages across the transistors 23 and 24 never reach the value of Vsupply.

It is on object of the present invention to provide mixed signal integrated circuits with an improved analog signal processing performance.

It is on object of the present invention to provide a digital CMOS integrated circuit comprising analog signal processing circuitry where the signal swing in the analog signal processing circuitry is allowed to cover the whole supply voltage range between zero Volts and the maximum allowed supply voltage (Vmax).

SUMMARY OF THE INVENTION

According to the present invention, a voltage is generated by a local charge pump and locally added to the chip supply so as to allow analog signal swings to range between 0 Volts and the FET's maximum allowed supply voltage value (Vmax).

Local charge pumps are presented herein that allow to generate the required elevated voltages. A local charge pump, according to the present invention, converts pulses into charge stored on a capacitor. This charge is then used to generate the elevated voltage. By locally increasing the supply for some transistor nodes of the analog signal processing circuitry, the dynamic signal range of the respective portion of the analog signal processing circuitry is increased.

In other words, a scheme is proposed which allows the supply of analog signal processing circuitry with local charge pumps beyond the maximum allowed supply voltage (Vmax) of a submicron or deep submicron process keeping the voltage across any individual FET below the Vmax.

BRIEF DESCRIPTION OF THE DRAWINGS

For a more complete description of the present invention and for further objects and advantages thereof, reference is made to the following description, taken in conjunction with the accompanying drawings, in which.

DESCRIPTION OF PREFERRED EMBODIMENTS

According to the present invention, a voltage is generated and locally added to the chip supply so as to allow analog signal swings to range between 0 Volts and the FET's maximum allowed supply voltage value (Vmax). Special local charge pumps are proposed.

The inventive scheme is in more detail described in connection with FIGS. 3 through 11.

The local charge pumps presented herein allow to generate the required elevated voltages (e.g., Vsupplydiff). A local charge pump, according to the present invention, converts pulses into charge stored on a capacitor. This charge is then used to generate the elevated voltage. By locally increasing the supply for some transistor nodes of the analog signal processing circuitry, the dynamic signal range of the respective portion of the analog signal processing circuitry is increased.

A local charge pump 30 (see FIG. 3) is a circuit that adds a voltage (herein referred to as reference voltage Vref) to the supply voltage (herein referred to as VDD), resulting in an elevated voltage (herein referred to as Vhigh). In other words, the local charge pump 30 provides Vhigh=VDD+Vref.

Figure 4:
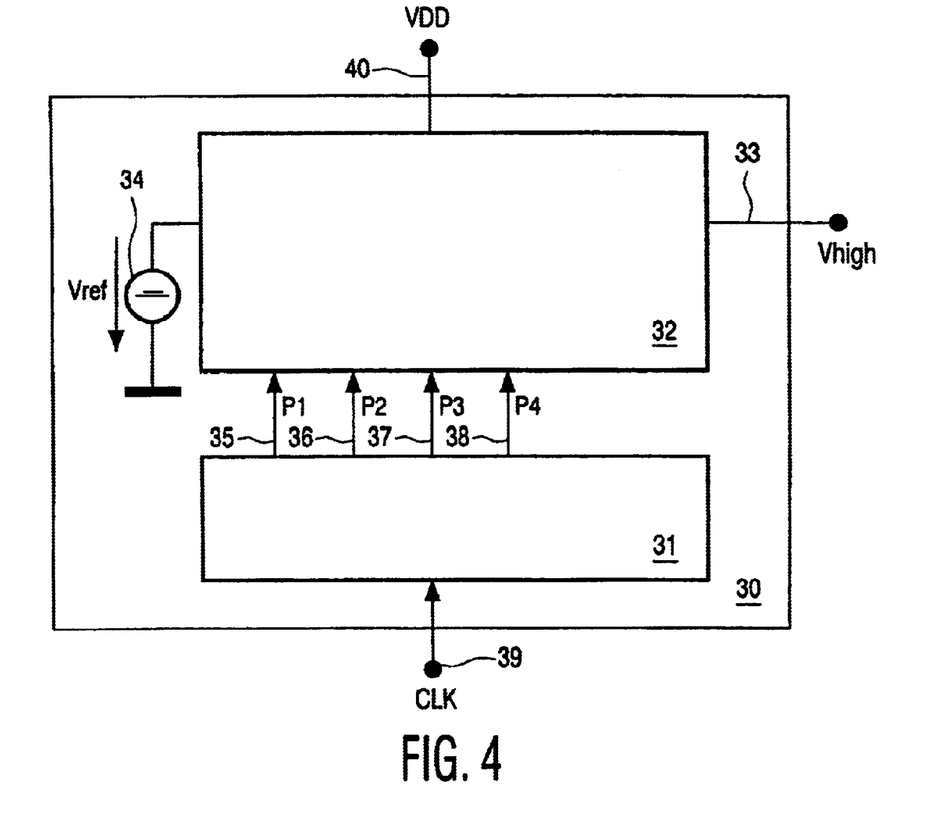
FIG. 4 is a schematic illustration of a local charge pump, in accordance with the present invention.
Figure 5:
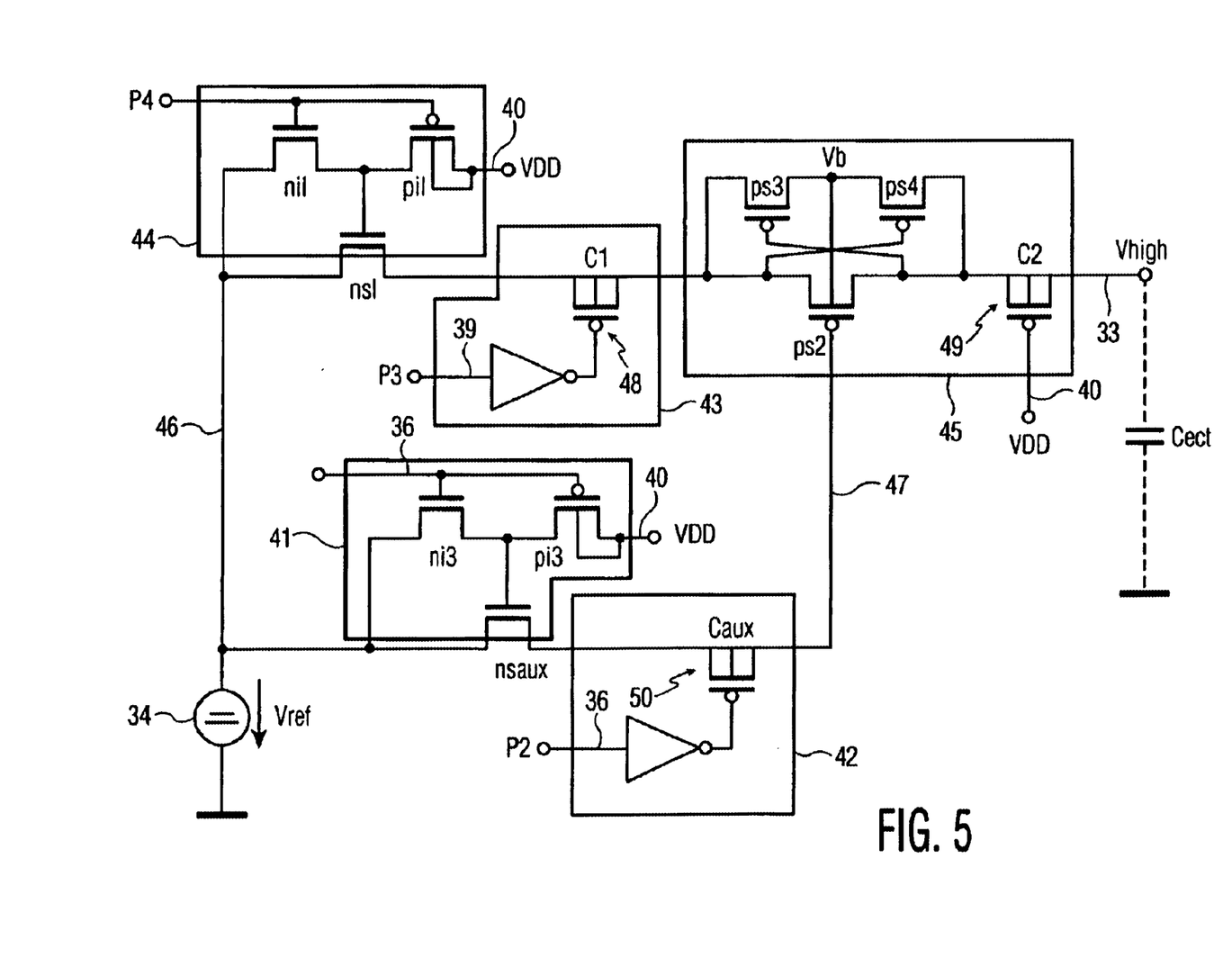
FIG. 5 is a schematic illustration of a pump circuit, in accordance with the present invention.

This principle is schematically illustrated in FIG. 4. The local charge pump 30 comprises a clock generating circuit 31 and a pump circuit 32. Details of one possible embodiment of such a pump circuit 32 are depicted in FIG. 5. A reference voltage (Vref) is generated by a voltage source 34. This reference voltage Vref is applied to the pump circuit 32. Also applied is the supply voltage VDD via supply node 40.

In the present example, the clock generating circuit 31 provides the clock signals P1, P2, P3, and P4. These clock signals are applied via the input lines 35, 36, 37, and 38 to the pump circuit 32 where they 'trigger' certain steps inside the pump circuit 32 at the end of which the elevated voltage Vhigh becomes available at the output 33. As illustrated in FIG. 4, the clock generating circuit 31 operates on a clock signal CLK applied via a clock input line 39. This clock signal CLK may for example be a clock signal provided by the surrounding circuitry, e.g., the integrated circuit of which the local charge pump 30 forms a part.

Details of one possible implementation of the pump circuit 32 are illustrated in FIG. 5. All CMOS FET transistors serving as inverters are designated in FIG. 5 by a lower case "i" and all CMOS FET transistors serving as switches are designated by a lower case "s". The n-channel CMOS FETs further are designated by an "n" whereas the p-channel CMOS FETs carry a "p". Note that in the present embodiment the CMOS bulk of each of the n-channel transistors ni1, ni3, and ns1 is connected to ground. The CMOS bulk of each of the two p-channel transistors pi1, pi3 is connected to VDD.

In the present embodiment p-channel transistors 48, 49, and 50 serve as capacitors C1, C2 and Caux.

The pump circuit 32 comprises five circuits 41-45 some of which comprise capacitors C1, C2 and Caux, as schematically illustrated. These capacitors are charged. The timing of the clock signals P1–P4 is chosen such that the elevated voltage Vhigh is generated at the output 33. A load at the output 33 discharges the reservoir capacitor C2. Before the voltage across the reservoir capacitor C2 drops below a threshold, the loading cycle is repeated again and again. The period of the clock cycles is adjusted such that the voltage Vhigh does not drop below the threshold voltage.

According to the embodiment illustrated in FIG. 5, the voltages Vref and VDD are added in that the capacitor C1 is loaded such that it takes on the voltage Vref. Basically, the non-overlapping phases P3 and P4 store Vref on the capacitor C1 with the aid of the switch ns1. Then the capacitor C1 is pushed up with its lower plate to the supply voltage VDD, so on its higher plate Vhigh is generated and then transferred via the switch ps2 to the reservoir capacitor C2. In other words, the voltage Vref across the capacitor C1 is added to the voltage VDD across the reservoir capacitor C2 such that at the end of some clock cycles the elevated voltage Vhigh=Vref+VDD is obtained.

The circuit 45 is employed to ensure that no current flows which would discharge the capacitor C1. The bulk of all the transistors ps2, ps3, and ps4 of the circuitry 45 is connected to the highest possible voltage Vb in order to ensure that all parasitic diodes are blocked, i.e., to avoid that the associated parasitic diodes enter their conduction region.

In order to be able to drive the gate of the transistor ps2 in a proper way, i.e., to switch it off to be non-conducting, turn it on properly and also to keep the voltages across the terminals of ps2 within the limit of VDD, an auxiliary circuit 42 is employed. The circuit 42 comprises a switch nsaux and the capacitor Caux. The phase P1 and P2 are chosen such that the circuit 42 charges the capacitor Caux with a voltage Vaux. This voltage Vaux is applied to the circuitry 45 where it closes the transistor ps2. This transistor ps2 when closed ensures that the elevated voltage Vhigh at the output 33 is not reduced due to currents flowing back through the circuitry 45.

In the structure illustrated in FIG. 5, care is taken that no transistor is operated beyond the allowed maximum voltage range of VDD on any of its terminals.

Optionally, the reservoir capacitor C2 may be shunted by an external larger capacitor or even be replaced by a larger one.

Figure 6:
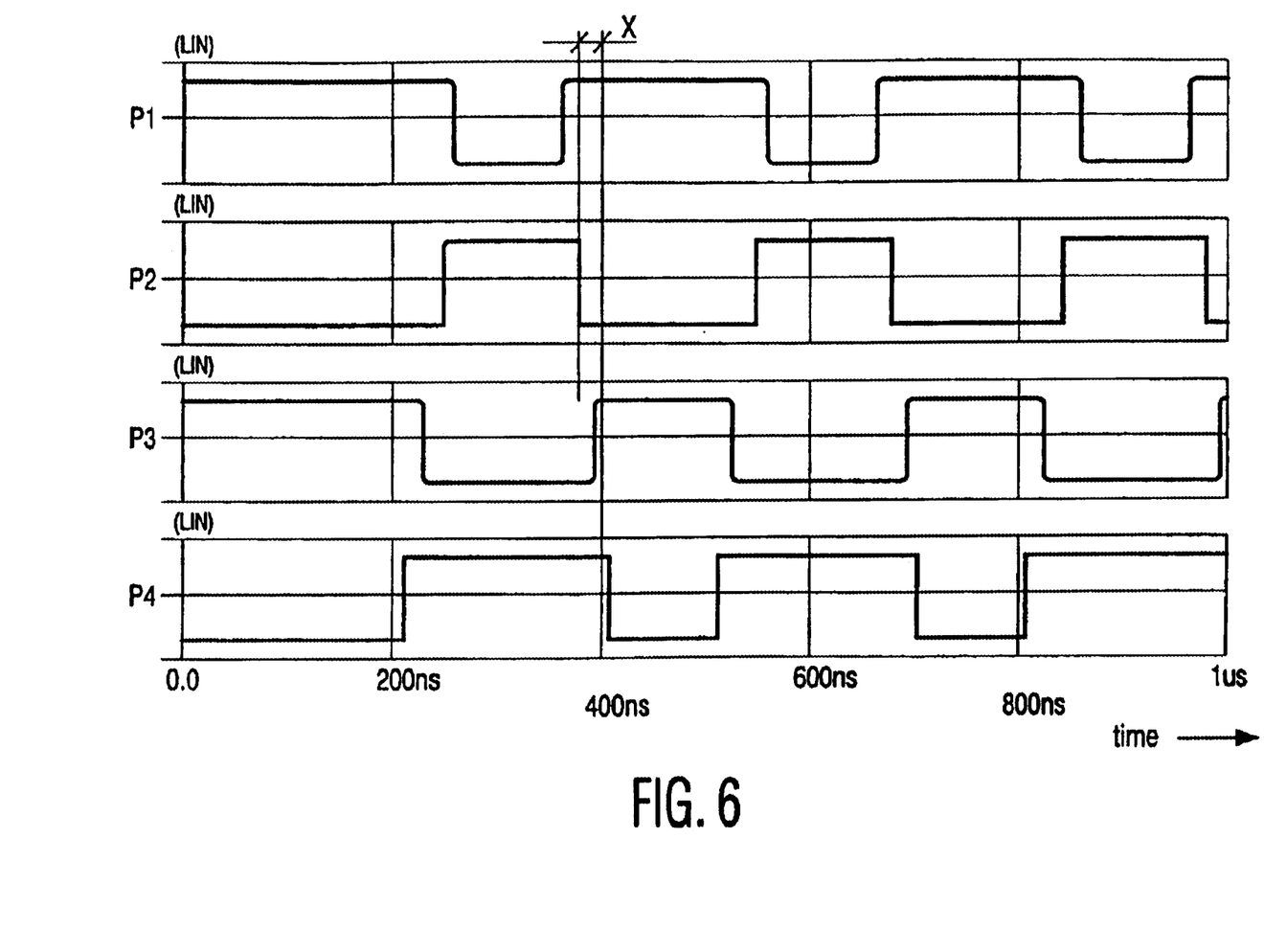
FIG. 6 is a timing diagram illustrating the clock signals P1 through P4, in accordance with the present invention.

The corresponding timing diagram is depicted in FIG. 6. The relation of the individual non-overlapping phases of the four clock signals P1, P2, P3, and P4 is shown.

Figure 7:
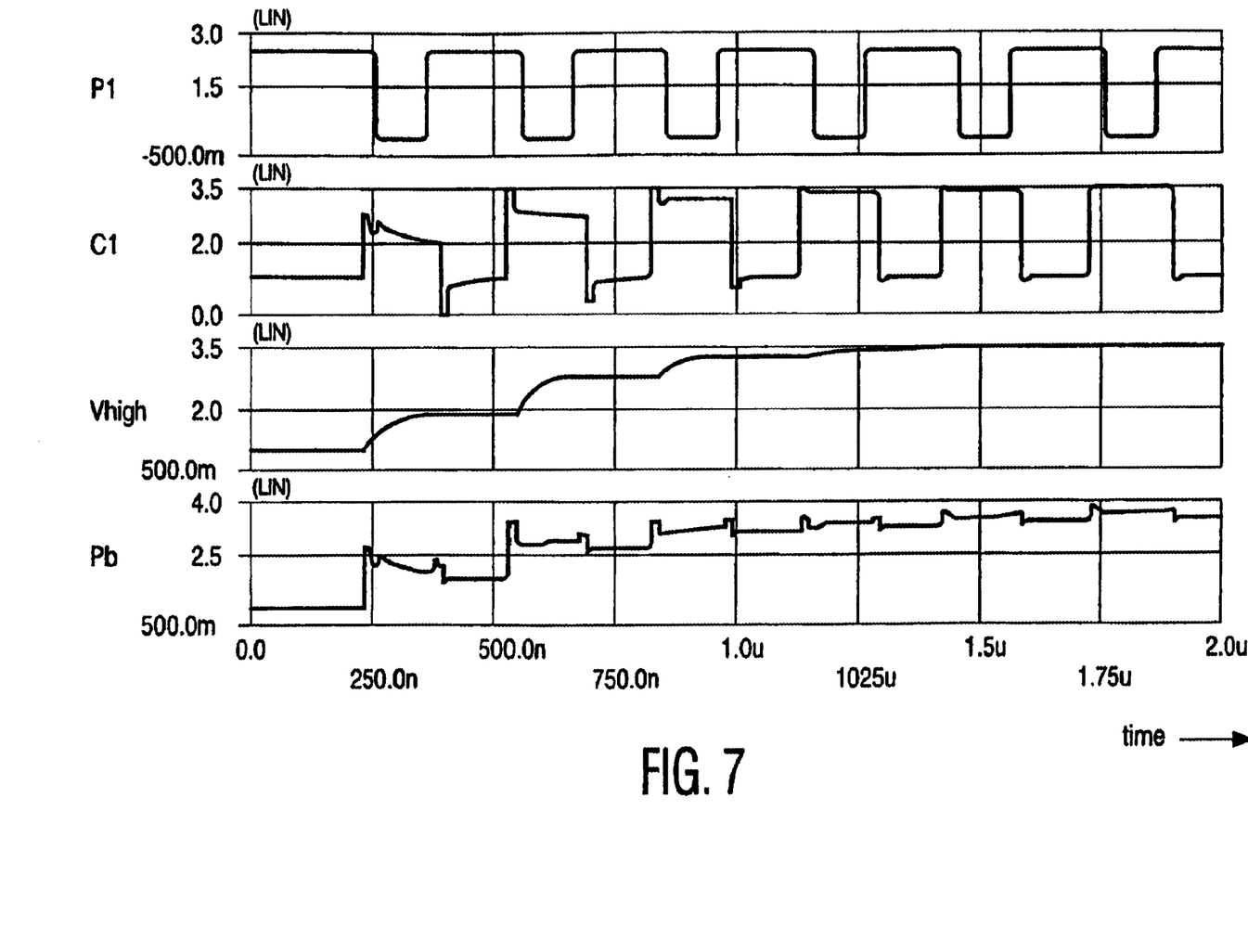
FIG. 7 is a diagram illustrating the charge pump signals, in accordance with the present invention.

The corresponding charge pump signals are depicted in FIG. 7. The voltage on the capacitor C1, the voltage Vhigh, and the voltage Vb are shown in relation to the pulses of the clock signal P1. In the present case the voltage Vref=1 V and the voltage VDD=2.5 V.

Figure 8:
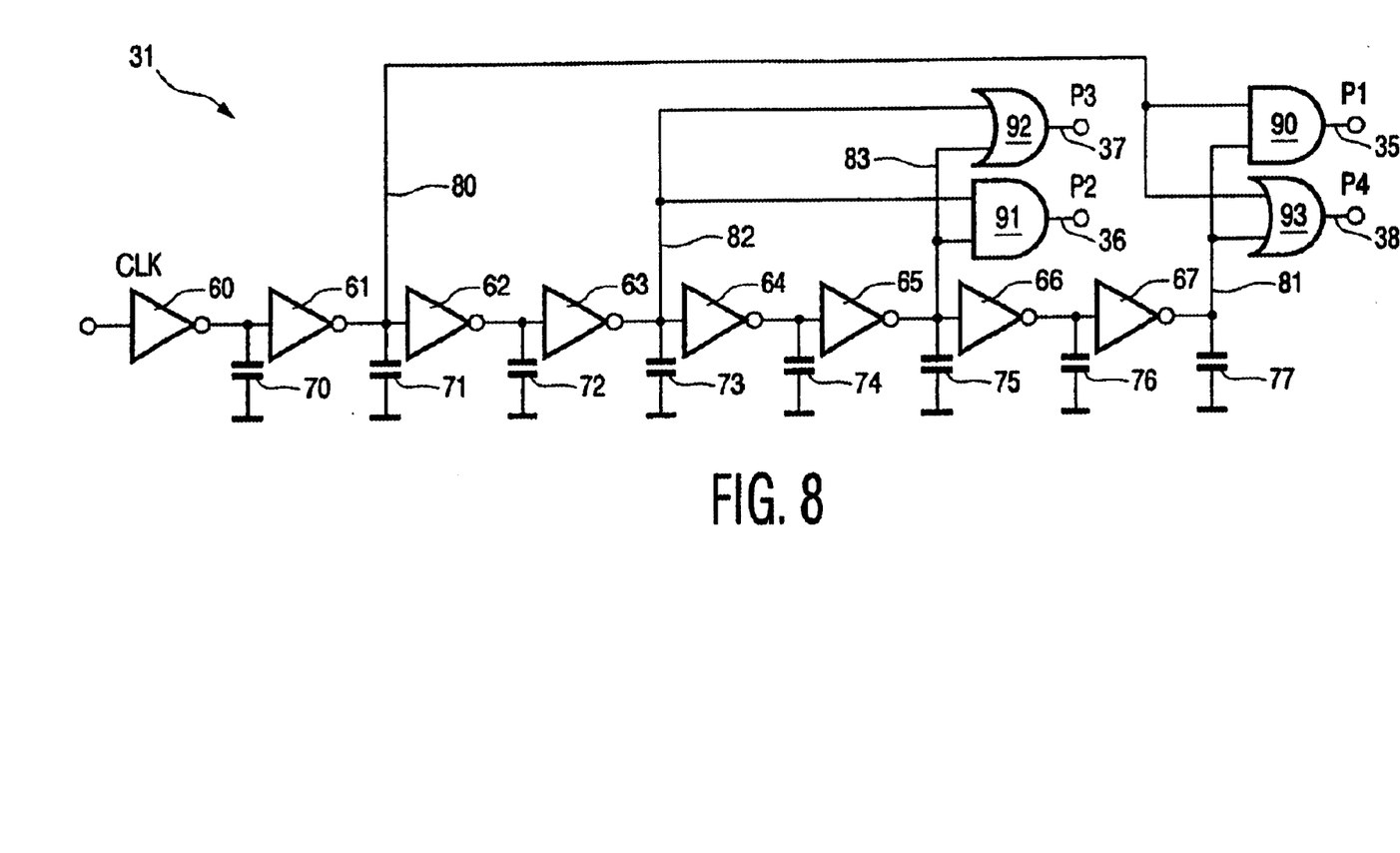
FIG. 8 is a schematic illustration of an analog clock generating circuit, in accordance with the present invention.

An exemplary implementation of a clock generating circuit 31 is given in FIG. 8. It is obvious that the non-overlapping clock signals P1–P4 can be generated out of a clock signal CLK with the aid of digital design techniques. For low power consumption, however, it may be useful to generate the clock signals P1–P4 in an analog fashion. Such an analog implementation is shown in FIG. 8. The clock generating circuit 31 comprises a series of inverters 60–67. These inverters together with the capacitors 70–77 delay the clock signal CLK step-by-step in order to provide for the necessary time gaps X between the clock signals P1–P4, illustrated in FIG. 6. The output signal 80 of the inverter 61 is fed together with the output signal 81 of the inverter 67 to an AND-gate 90. This AND-gate generates the clock signal P1. The output signal 82 of the inverter 63 is fed together with the output signal 83 of the inverter 65 to the OR-gate 92. This OR-gate generates the clock signal P2. A second AND-gate 91 processes the output signals 82 and 83 to generate the clock signal P3 and an OR-gate 93 processes the signals 80 and 81 in order to generate the clock signals P4.

There are different ways to generate the reference voltage Vref. Three embodiments for the generation of the reference voltage are now described with reference to the FIGS. 9A–9C. It is an advantage of these three embodiments that the reference voltage is generated in a way to match the requirements appropriately. In case of the example given in FIG. 2, the reference voltage generator should reflect the behavior of the series connection of a saturation voltage Vs of the transistor 25 serving as current source and the threshold Vth of one of the two input transistors 23 or 24 in terms of magnitude, fabrication process matching, and temperature coefficient. Any Vref value can be generated following the principles depicted in FIGS. 9A–9C, provided the fabrication process requirements with respect to the maximum allowable voltage across the individual nodes is obeyed.

Figure 9A:
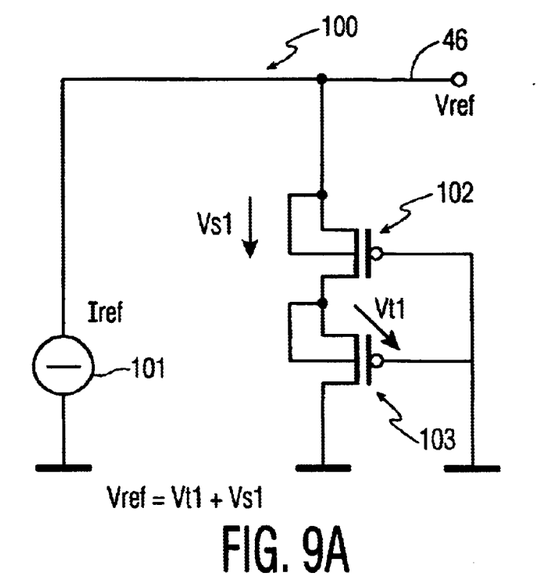
FIG. 9A is a schematic illustration of reference voltage generator, in accordance with the present invention.
Figure 9B:
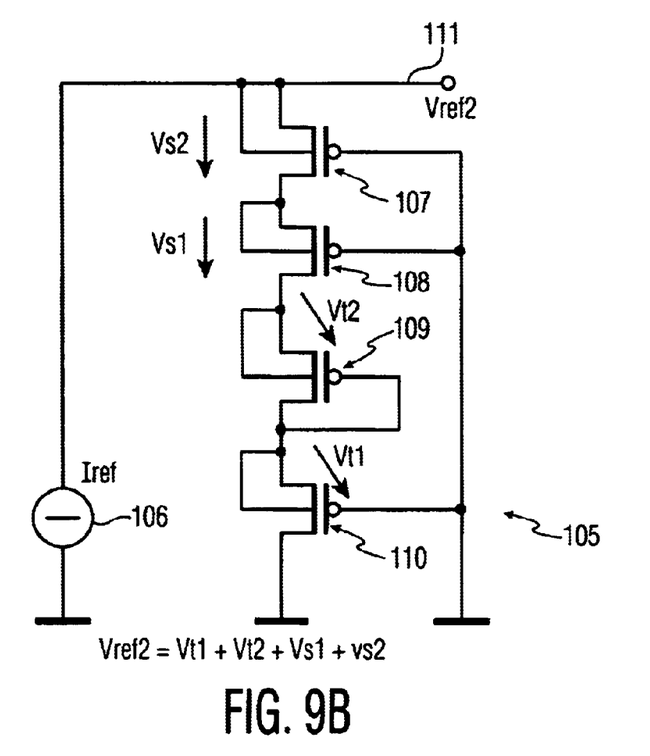
FIG. 9B is a schematic illustration of another reference voltage generator, in accordance with the present invention.
Figure 9C:
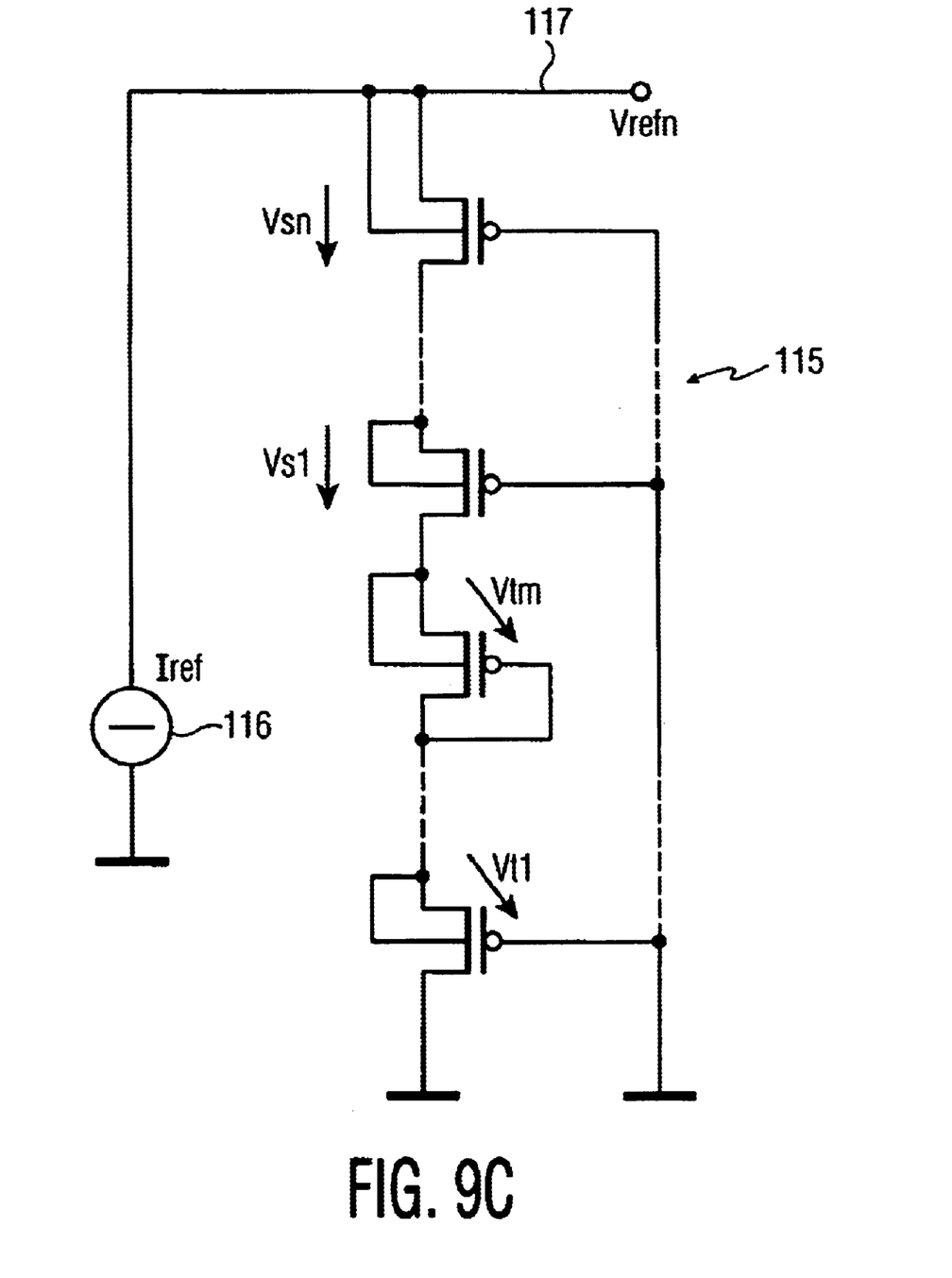
FIG. 9C is a schematic illustration of generalized reference voltage generator, in accordance with the present invention.

As illustrated in FIGS. 9A–9C, matching is achieved by using the same type of transistors in terms of size and operating point as used in the structure (e.g., the structure 32 in FIG. 4A) to be supplied with an reference voltage Vref.

The reference voltage generator 100 of FIG. 9A comprises a current source 101 providing a reference current Iref, and two p-channel transistors 102, 103. This reference voltage generator 100 provides a reference voltage Vref between the output node 46 and ground. Vref is defined by the superposition of the saturation voltage Vs1 and the threshold voltage Vt1, i.e., Vref=Vs1+Vt1.

Another reference voltage generator 105 is illustrated in FIG. 9B. The generator 105 comprises a current source 106 providing a reference current Iref, and four p-channel transistors 107 through 110. The reference voltage generator 105 provides a reference voltage Vref2 between the output node 111 and ground. Vref2 is defined as follows: Vref2=Vt1+Vt2+Vs1+Vs2.

A generalization of these two voltage generators 100 and 105 is depicted in FIG. 9C. The reference voltage generator 115 comprises a current source 116 providing a reference current Iref, and a series of p-channel transistors. The reference voltage Vrefn between the output node 117 and ground is defined as follows:

$$Vrefn = \sum_{i=1}^{n} Vsi + \sum_{j=1}^{m} Vtj.$$

Figure 10:
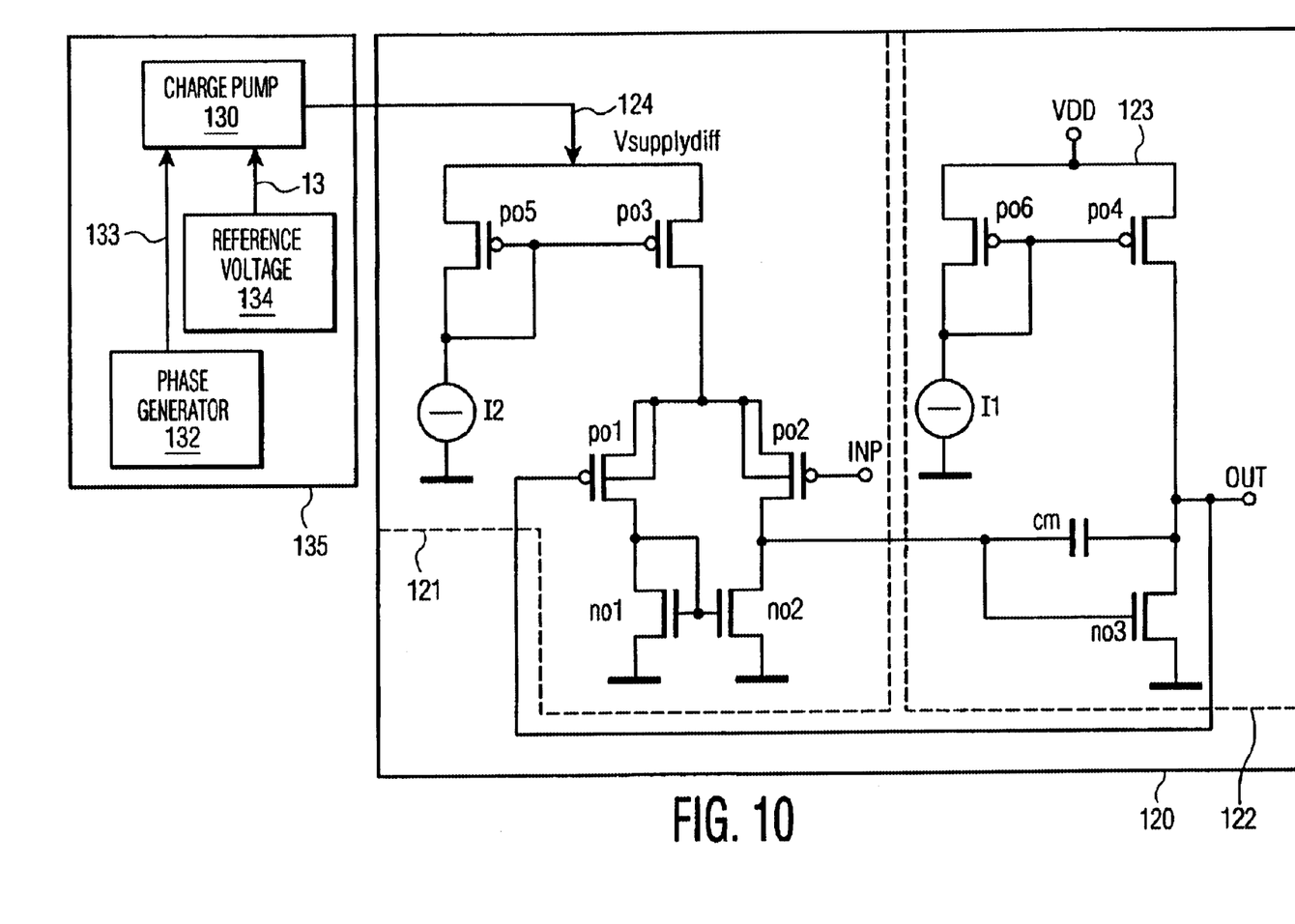
FIG. 10 is a schematic illustration of an application example, in accordance with the present invention.

As an example for the application and use of a local charge pump 135 in accordance with the present invention, a Miller-type operational amplifier 120 is illustrated in FIG. 10. The Miller-type operational amplifier 120 (OpAmp) comprises a differential input stage 121 that is similar to the differential input stage 20 of FIG. 2. The differential input stage 121 comprises six transistors p01, p02, p03, p05, n01, and n02, and a current source 12. Furthermore, the Miller-type operational amplifier 120 comprises an output stage 122. This output stage 122 comprises the transistors p04, p06, n03, a Miller capacitor cm and a current source I1. The Miller-type operational amplifier 120 is configured to act as a unity gain buffer. The output stage 122 is supplied by VDD at node 123 and the differential input stage 121 is supplied by Vsupplydiff at node 124. The full voltage swing is available at the output OUT of the Miller-type operational amplifier 120. In this case the signal at INP may cover the full swing of=V to VDD without being limited by the supply of the differential stage reaching only to VDD.

A local charge pump 135 supplies the elevated voltage Vsupplydiff at node 124. The local charge pump 135 comprises a pump circuit 130 (e.g., a pump circuit similar to the pump circuit 32 in FIG. 4), a clock generating circuit 132 (e.g., a clock generating circuit similar to the clock generating circuit 31 in FIG. 4), and a reference voltage generator 131. The clock generating circuit 132 provides clock signals (e.g., the signals P1–P4) via connection 133 to the pump circuit 130. The reference voltage necessary for proper operation of the pump circuit 130 is applied via connection 134.

Figure 11:
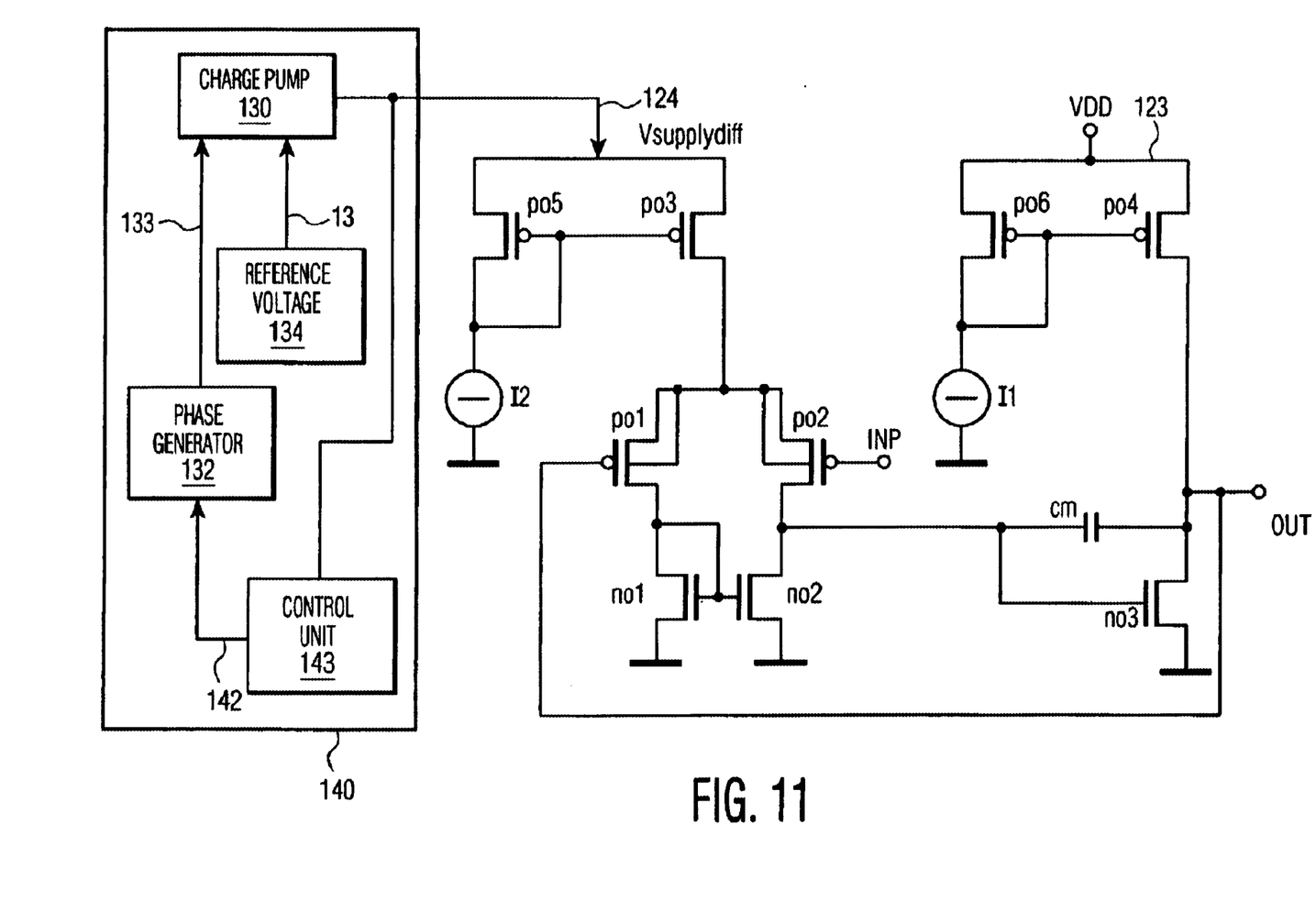
FIG. 11 is a schematic illustration of another application example, in accordance with the present invention.

With mobile applications in mind, an optional low-power implementation can be in that one integrates a control unit 143 with feedback loop. Such a modified local charge pump 140 is illustrated in FIG. 11. This modified local charge pump 140 supplies an elevated voltage Vsupplydiff to the same Miller-type operational amplifier 120. A control unit 143 is added which allows to sense the voltage at the output 124 via a sensing line 141. The control unit 143 is designed such that the clock generating circuit 132 is switched to a mode where energy is saved if the elevated voltage Vsupplydiff is above a certain threshold Vx. When the elevated voltage Vsupplydiff goes below the certain threshold Vx, the control unit 143 causes the clock generating circuit 132 to return to a normal mode of operation such that the respective clock signals (e.g., the signals P1–P4) are sent via connection 133 to the pump circuit 130. The pump circuit 130 then pushes the elevated voltage Vsupplydiff up. This process can be repeated.

In the present embodiment, Vx may for example be defined as follows:

Vx=Vsupplymax−50 mV.

To allow a safety margin on the supply voltage generator, a typical VDD may be chosen to be between 20% and 5% below Vmax. Preferably, VDD is about 10% below Vmax.

According to the present invention, a voltage (e.g., Vdiff=Vt1+Vs in case of FIG. 2) is generated and locally added to the chip supply voltage (e.g., VDD) so as to allow the analog signal swing (e.g., the signal swing at the inputs 21 and 22 of the amplifier 20) to range between 0 Volts and VDD.

The present invention allows realizing better single-chip digital radios and optical communications chips. The invention can be used in computers, handsets, wireless modems and related devices.

Integrated circuits (ICs) in accordance with the present invention can be used to serve communications markets.

The present invention permits digital signal processors (DSPs) which operate in the low voltage range.

The circuitry presented herein can be made together with analog circuitry and the digital-signal-processing circuitry in a fully integrated process.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable subcombination.

In the drawings and specification there has been set forth preferred embodiments of the invention and, although specific terms are used, the description thus given uses terminology in a generic and descriptive sense only and not for purposes of limitation.

What is claimed is:

1. Digital CMOS integrated circuit (120) comprising analog signal processing circuitry with a plurality of field-effect transistors (FETs) which would under bias conditions be operated significantly below a maximum allowed supply voltage value (Vmax), characterized in that a local charge pump (135) is employed for generating an elevated supply voltage (Vsupplydiff) larger than the maximum allowed supply voltage value (Vmax), the local charge pump (135) being arranged such that this elevated supply voltage (Vsupplydiff) is applied to a series of two or more of the field-effect transistors (FETs).

2. The digital CMOS integrated circuit of claim 1, wherein the local charge pump (135) comprises a pump circuit (130) and a clock generating circuit (132).

3. The digital CMOS integrated circuit of claim 2, wherein the pump circuit (130) comprises a circuit (45) being employed to ensure that no current flows back through the pump circuit (130) which would reduce the elevated supply voltage (Vsupplydiff).

4. The digital CMOS integrated circuit of claim 2, wherein the pump circuit (130) comprises a reference voltage generator (131) that provides a reference voltage (Vref) to the pump circuit (130).

5. The digital CMOS integrated circuit of claim 2, wherein the reference voltage generator (131) comprises a current source (116) and a plurality of transistors.

6. The digital CMOS integrated circuit of claim 2, wherein the pump circuit (130) generates the elevated supply voltage (Vsupplydiff).

7. The digital CMOS integrated circuit of claim 2, wherein the pump circuit (130) comprises a plurality of circuits (41–45) and a plurality of capacitors (C1, C2, Caux) arranged such that the capacitors (C1, C2, Caux) are charged step-by-step when generating the elevated supply voltage (Vsupplydiff).

8. The digital CMOS integrated circuit of claim 7, wherein the clock generating circuit (132) generates a plurality of clock signals (P1–P4) which are fed to the pump circuit (130) where they trigger step-by-step the charging of the capacitors (C1, C2, Caux).

9. The digital CMOS integrated circuit of claim 8, wherein the clock signals (P1–P4) are clock signals with non-overlapping phases.

10. The digital CMOS integrated circuit of claim 8, wherein the clock generating circuit (132) comprises a plurality of delay blocks (60–67, 70–77) and logic gates (90–93).

11. The digital CMOS integrated circuit of claim 2, wherein the field-effect transistors are CMOS transistors.

12. The digital CMOS integrated circuit of claim 1, wherein in order to allow a safety margin on the local charge pump (135), a supply voltage (VDD) is chosen to be between 20% and 5% below the maximum allowed supply voltage value (Vmax), preferably about 10% below the maximum allowed supply voltage value (Vmax).

13. The digital CMOS integrated circuit of claim 2, comprising a control unit (143) allowing the clock generating circuit (132) to be switched to a mode where energy is saved if the elevated supply voltage (Vsupplydiff) is above a certain threshold value (Vx).

14. The digital CMOS integrated circuit of claim 13, wherein the control unit (143) causes the clock generating circuit (132) to return to a normal mode of operation.

15. Single-chip digital radio or optical communications chip comprising a digital CMOS integrated circuit according to claim 1.

16. Digital CMOS integrated circuit (12) comprising analog signal processing circuitry with a plurality of field-effect transitors (FETs) with a maximum allowed supply voltage value (Vmax), the layout of the analog signal processing circuitry being such that a series of two or more of the field-effect transistors (FETs) would under bias conditions be operated significantly below the maximum allowed supply voltage value (Vmax), characterized in that a local charge pump (135) is employed for generating an elevated supply voltage (Vsupplydiff) larger than the maximum allowed supply voltage value (Vmax), the local charge pump (135) being arranged such that this elevated supply voltage (Vsupplydiff) is applied to the series of two or more of the field-effect transistors (FETs).

17. Digital CMOS integrated circuit (120) comprising analog signal processing circuitry with a series of two or more field-effect transistors (FETs) with a maximum allowed supply voltage value (Vmax), characterized in that a local charge pump (135) is employed for generating an elevated supply voltage (Vsupplydiff) larger than the maximum allowed supply voltage value (Vmax), the local charge pump (135) being arranged such that this elevated supply voltage (Vsupplydiff) is applied to the series of two or more of the field-effect transistors (FETs).

18. Method for generating an elevated supply voltage (Vsupplydiff) to be applied to a series of two or more field-effect transistors (FETs) of an analog signal processing circuitry being part of a digital CMOS integrated circuit (120), whereby the field-effect transistors (FETs) have a maximum allowed supply voltage value (Vmax) and whereby the elevated supply voltage (Vsupplydiff) is larger than the maximum allowed supply voltage value (Vmax), comprising the steps:

generating a plurality of clock signals (P1–P4) and applying these clock signals (P1–P4) to a pump circuit (130) comprising a plurality of capacitors (C1, C2, Caux);

providing a reference voltage (Vref) to the pump circuit (130);

generating the elevated supply voltage (Vsupplydiff) by charging step-by-step the plurality of capacitors (C1, C2, Caux).

19. The method of claim 18, comprising the step detecting whether the elevated supply voltage (Vsupplydiff) is above a certain threshold value (Vx).

20. The method of claim 19, comprising the step switching to a mode of operation where energy is saved when the elevated supply voltage (Vsupplydiff) is above the certain threshold value (Vx).

21. The method of claim 19, comprising the step switching to a normal mode of operation where the elevated supply voltage (Vsupplydiff) is generated when the elevated supply voltage (Vsupplydiff) is below the certain threshold value (Vx).

* * * * *